United States Patent Office 2,732,401
Patented Jan. 24, 1956

2,732,401

PREPARATION OF DITHIOOXAMIDE

George B. De La Mater, St. Johns, Mo., assignor to Mallinckrodt Chemical Works, St. Louis, Mo., a corporation of Missouri No Drawing. Application March 26, 1953,
Serial No. 344,910

5 Claims. (Cl. 260—551)

This invention relates to the preparation of dithiooxamide, and more particularly to a process of preparing dithiooxamide in an aqueous reaction medium.

Briefly, the invention is directed to a process of preparing dithiooxamide which comprises reacting cyanogen and a water-soluble source of sulfhydrate ions in an aqueous reaction medium while maintaining the pH between approximately 6 and 10 by addition of an acid having a dissociation constant greater than $0.3 \times 10^{-9}$.

Among the objects of this invention may be noted the provision of an economical and convenient process for preparing dithiooxamide; the provision of such a process wherein it is unnecessary to employ pure cyanogen or hydrogen sulfide as reactants; and the provision of such a process wherein the reaction medium may be aqueous. Other objects and features will be in part apparent and in part pointed out hereinafter.

The invention accordingly comprises the methods hereinafter described, the scope of the invention being indicated in the following claims.

Dithiooxamide, also known as rubeanic acid, is a valuable chemical reagent useful for the detection of certain metallic elements as well as for various other purposes. Several procedures for its preparation from cyanogen and hydrogen sulfide or a sulfhydrate have been proposed and used. These methods have, however, been unsatisfactory from a commercial standpoint. For example, the use of pure cyanogen gas and an anhydrous reaction medium has been deemed necessary. Moreover, cyanogen itself was expensive, being generated by thermal decomposition of heavy metal cyanides such as those of silver or mercury.

More recently it has been proposed to prepare cyanogen by reacting chlorine and hydrogen cyanide in the vapor phase over a solid catalyst at elevated temperatures. For every mole of cyanogen which is produced by this process, there are formed two moles of hydrogen chloride which must be removed by scrubbing the effluent gas stream with a countercurrent stream of water. Difficulties are encountered, however, in removing the hydrogen chloride. In the first place, a large amount of water must be passed through the scrubber to avoid an excessive temperature rise caused by the solution of the hydrogen chloride in water, and to prevent the resulting hydrochloric acid from becoming so concentrated that the cyanogen is hydrolyzed to oxalic acid or its derivatives. However, when these large quantities of water pass through the scrubber it is found that a substantial percentage of the cyanogen is dissolved in the water and thereby lost. Another difficulty is the formation of a fog or smoke composed of tiny droplets of concentrated hydrochloric acid. This fog, once formed, cannot easily be removed from the gas stream and it passes out of the scrubber together with the cyanogen.

In accordance with the present invention, it has been found that under certain conditions rubeanic acid can be prepared from cyanogen and a sulfhydrate in an aqueous medium. Moreover, I have found that it is possible in one embodiment of the invention to use the mixture of cyanogen and hydrogen chloride, referred to above, without first removing the hydrogen chloride.

According to the present invention, cyanogen is added to an aqueous solution containing sulfhydrate ions while maintaining the pH between approximately 6 and 10 by addition of an acid. A smooth rapid reaction takes place, and dithiooxamide precipitates in the form of brilliant orange crystals. This reaction is shown in the following equation:

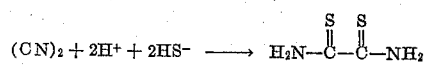

While the use of a cyanogen-hydrogen chloride mixture, such as described above, is particularly convenient, the hydrogen ions required in the above reaction can be supplied in the form of an acid having a dissociation constant greater than approximately $0.3 \times 10^{-9}$. For example, hydrochloric acid, sulfuric acid, phosphoric acid, nitric acid and acetic acid can be used. The sulfhydrate ions can be supplied from any water-soluble source of sulfhydrate ions such as the sulfhydrates and sulfides of the alkaline earth metals, alkali metals and ammonium. Sodium sulfhydrate is generally preferred because it is inexpensive and readily available.

While the reaction can be carried out in a reaction medium having a pH of between approximately 6 and 10, it is usually preferred to maintain the pH of the reaction between 7 and 9. The reaction will not proceed in a highly acidic reaction medium.

The following example illustrates the invention:

Example

A gaseous mixture of hydrogen chloride and cyanogen (2 moles HCl to 1 mole $(CN)_2$) was prepared by passing chlorine (1.9 l. per min.) and hydrogen cyanide (4 l. per min.) (2.1:1 molar ratio of HCN to $Cl_2$) in the vapor phase through a one-inch "Vicor" reaction tube packed with eighteen inches of 4–6 mesh carbon (sold under the trade designation "Norit C"). Sixteen inches of the catalyst bed were surrounded by an electric heater which held the temperature between 340°–840° C.

The effluent gases were absorbed by a vigorously stirred solution of sodium sulfhydrate (1050 g.) in water (6 l.), maintained at a temperature below 50° C. by cooling, while the pH remained between 7 and 9. After one hour the reaction was stopped and the bright orange crystalline product which had separated was collected on a Buchner funnel and washed free of mother liquor with water. After drying, the product, rubeanic acid, weighed 379 g., 61.3% of theory (based on chlorine).

It is to be understood that, in place of gaseous hydrogen chloride, other acids such as, for example, aqueous hydrochloric acid, sulfuric acid, phosphoric acid, nitric acid or acetic acid can be used. In a similar manner, in place of sodium sulfhydrate, other water-soluble sources of sulfhydrate ions such as, for example, potassium sulfhydrate, calcium sulfhydrate, magnesium sulfhydrate and ammonium sulfhydrate can be used. The corresponding sulfides, such as, for example, sodium sulfide and ammonium sulfide, which yield sulfhydrate ions upon the addition of a suitable quantity of acid are also useful in the practice of the invention.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

I claim:
1. The process of preparing dithiooxamide which comprises passing gaseous cyanogen into an aqueous solution of a compound selected from the group consisting of sodium sulfhydrate, potassium sulfhydrate, calcium sulfhydrate, magnesium sulfhydrate, ammonium sulfhydrate, sodium sulfide and ammonium sulfide while maintaining the pH between approximately 6 and 10 by addition of an acid selected from the group consisting of the mineral acids and acetic acid.

2. The process of preparing dithiooxamide which comprises passing gaseous cyanogen into an aqueous solution of sodium sulfhydrate while maintaining the pH between approximately 7 and 9 by addition of a mineral acid.

3. The process of preparing dithiooxamide comprising passing a gaseous mixture of hydrogen chloride and cyanogen through an aqueous solution of a compound selected from the group consisting of sodium sulfhydrate, potassium sulfhydrate, calcium sulfhydrate, magnesium sulfhydrate, ammonium sulfhydrate, sodium sulfide and ammonium sulfide, the reaction mixture having a pH between approximately 6 and 10.

4. The process of preparing dithiooxamide comprising passing a gaseous mixture of hydrogen chloride and cyanogen, having an approximate molar ratio of 2:1 respectively, through a vigorously agitated aqueous solution of sodium sulfhydrate while maintaining the reaction mixture at a temperature below approximately 50° C. and at a pH between approximately 7 and 9, filtering off the reaction product, and thereafter washing said product with water.

5. In a process for preparing dithiooxamide, the steps comprising passing a gaseous mixture of hydrogen chloride and cyanogen, having an approximate molar ratio of 2:1 respectively, through a vigorously stirred aqueous solution of sodium sulfhydrate while maintaining the reaction mixture at a temperature below approximately 50° C. and at a pH between approximately 7 and 9.

References Cited in the file of this patent
UNITED STATES PATENTS

| | | |
|---|---|---|
| 2,484,257 | Watson et al. | Oct. 11, 1949 |
| 2,557,980 | Lane et al. | June 26, 1951 |

OTHER REFERENCES

"Chem. Abst.," vol. 42 (1948), page 4488.

Woodburn et al.: "J. Org. Chem.," vol. 17 (1952), page 374.

Formanek: "Ber. deut. Chem.," vol. 22 (1889), pp. 2655–56.